(12) United States Patent
Kataoka et al.

(10) Patent No.: US 6,983,085 B2
(45) Date of Patent: Jan. 3, 2006

(54) OPTICAL TRANSMISSION CIRCUIT

(75) Inventors: Tomoyoshi Kataoka, Yokohama (JP);
Akira Hirano, Yokohama (JP);
Akihiko Matsuura, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 145 days.

(21) Appl. No.: 10/358,737

(22) Filed: Feb. 5, 2003

(65) Prior Publication Data
US 2003/0147577 A1 Aug. 7, 2003

(30) Foreign Application Priority Data
Feb. 7, 2002 (JP) .............................. 2002-030406

(51) Int. Cl.
*G02F 1/035* (2006.01)
(52) U.S. Cl. .............................................. 385/3; 385/1
(58) Field of Classification Search .......... 385/1–10,14
See application file for complete search history.

(56) References Cited

U.S. PATENT DOCUMENTS

| | | | | |
|---|---|---|---|---|
| 5,278,923 A | * | 1/1994 | Nazarathy et al. .............. | 385/3 |
| 5,359,449 A | * | 10/1994 | Nishimoto et al. ......... | 398/198 |
| 5,400,417 A | * | 3/1995 | Allie et al. ..................... | 385/2 |
| 5,715,265 A | * | 2/1998 | Epworth .................. | 372/38.01 |
| 6,292,598 B1 | * | 9/2001 | Price et al. ..................... | 385/2 |
| 6,510,255 B2 | * | 1/2003 | Masuda et al. ................ | 385/2 |
| 2001/0030791 A1 | | 10/2001 | Taneda | |

FOREIGN PATENT DOCUMENTS

| | | |
|---|---|---|
| EP | 1 004 920 | 5/2000 |
| EP | 1 168 039 | 1/2002 |
| EP | 1 168 041 | 1/2002 |
| EP | 1168039 A2 | 1/2002 |
| JP | 2642499 | 5/1997 |
| JP | 10246871 | 9/1998 |
| JP | 10246872 | 9/1998 |
| JP | 10246874 | 9/1998 |
| JP | 2866901 | 12/1998 |
| JP | 2869585 | 1/1999 |

OTHER PUBLICATIONS

Jeff Hecht, "Understanding Fiber Optics," 1999, 4th edition, Prentice-Hall, Inc., p 307.*
"A 40-Gbit/s Optical Repeater Circuits using InAlAs/InGaAs HEMT Digital IC Chip Set", by M. Yoneyama, et al., 1997 IEEE MTT-S Digest, pp. 461-464.

(Continued)

*Primary Examiner*—John D. Lee
*Assistant Examiner*—James D. Stein
(74) *Attorney, Agent, or Firm*—Harness, Dickey & Pierce P.L.C.

(57) ABSTRACT

The optical transmission circuit of the present invention has an optical modulator 12 which modulates continuous light at wavelength λo with a signal at repetition frequency fo Hz and outputs alternating phase-inverted pulse light; a bias voltage applying unit 14 which applies a bias voltage to the optical modulator 12; an optical power spectrum measuring unit 17 having frequency resolution of less than fo Hz which measures the optical power spectrum of light output from the optical modulator 12; and a control circuit which controls the bias voltage via the bias voltage applying unit 14 based on measurements of the power spectrum of the output light of the optical modulator 12, so as to minimize the power intensity of the carrier spectrum component of wavelength λo, or to maximize the power intensity of the spectrum component in both side bands.

21 Claims, 16 Drawing Sheets

OTHER PUBLICATIONS

"Optical Amplifiers and Their Applications Topical Meeting—PostDeadline Papers—Friday, Jun. 11, 1999, 4:30 p.m., Nara, Japan—320 Gbit/s (8×40 Gbit/s) WDM Transmission Over 367-km zero-dispersion-flattened line with 120-km repeater spacing using carrier-suppressed return-to-zero pulse format", by Yutaka Miyamoto, et al., OSA TOPS, vol. 30, pp. 246-249.

"Duobinary carrier-suppressed return-to-zero format and its application to 100GHz-spaced 8×43-Gbit/s DWDM unrepeatered transmission over 163 km", by Yutaka Miyamoto, et al., 2000 Optical Society of America, pp. TuU4-1-TuU4-3.

"Suppression of Crosstalk Drift in Ti:LiNbO Waveguide Switches", by Takumi Fujiwara, et al., Journal of Lightwave Technology, vol. 6, No. 6, Jun. 1988, pp. 909-915.

"S-band 3×120-km DSF transmission of 8×42.7-Gbit/s DWDM duobinary-carrier-suppressed RZ signals generated by novel wideband PM/AM conversion", by Yutaka Miyamoto, et al., pp. PD6-1-PD6-3.

"5 40Gbit/s OCS 40G-5, Jun. 14, 2001—40Gbit/s Optical Transmitter and Receiver Using OTDM MUX/DEMUX Modules", M. Kagawa, et al., Oki Electric Industry Co., Ltd., Optical Network Development Division, pp. 33 & 35.

"LiNbO Instabilities and Their Characterization in Mach-Zehnder Ti:LiNbO Optical Modulators" By Hiromichi Jumonji and Toshinori Nozawa, Members, C-I, vol. J75-C-1, No. 1, pp. 17-26, Jan. 1992.

* cited by examiner

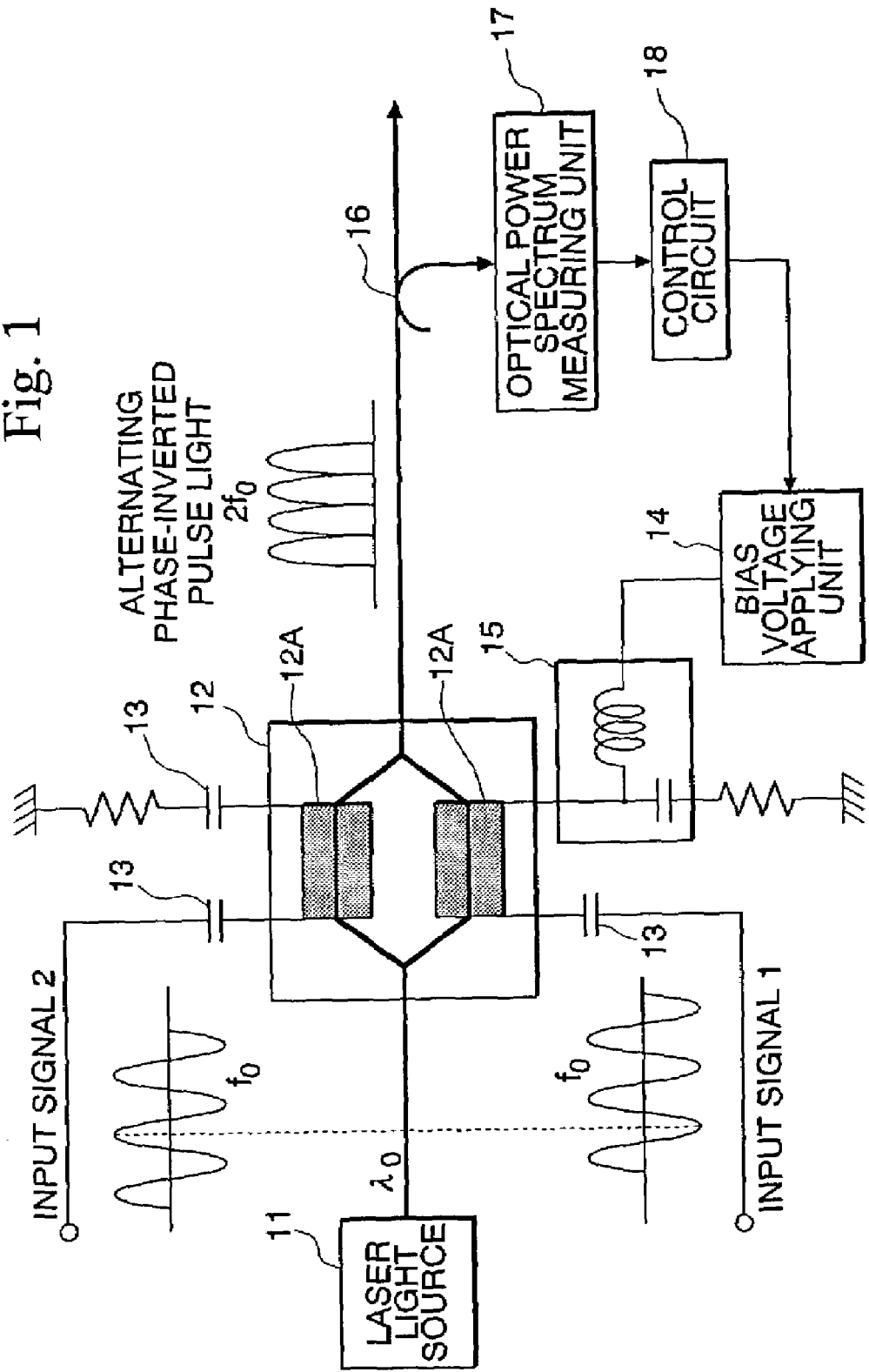

INPUT/OUTPUT CHARACTERISTICS
OF THE MACH-ZEHNDER OPTICAL MODULATOR 12

INPUT/OUTPUT CHARACTERISTICS WHEN THE BIAS VOLTAGE HAS DEVIATED FROM ITS OPTIMUM VALUE

OPTICAL SPECTRUM OF ALTERNATING
PHASE-INVERTED PULSE LIGHT ($f_0$ =10GHz)

BIAS VOLTAGE DEPENDENCY OF THE
CARRIER COMPONENT OF ALTERNATING
PHASE-INVERTED PULSE LIGHT

EXAMPLE OF PASS-BAND OF PASS-TYPE NARROW-BAND OPTICAL FILTER 31

OPTICAL TRANSMISSION CIRCUIT

BACKGROUND OF THE INVENTION

1. Field of the Invention

The present invention relates to an optical transmission circuit which creates an optical signal having a low ratio of degradation in transmission quality, caused by group velocity dispersion (GVD) of the transmission medium such as optical fiber.

2. Description of Related Art

While an optical transmission system can handle a large capacity with relative ease by the use of wavelength-division multiplexing (WDM), research is also being widely carried out to increase the speed of the bit-rate per wavelength. The reason for this is that increasing the speed of the bit-rate per wavelength reduces the cost of the apparatus, and reduces the initial cost of the total system and its running cost by miniaturizing the apparatus and reducing its power consumption. An electrical circuit which realizes channel power of 40-Gbit/s is already in the practical stage (Reference Document 1: M. Yoneyama et al., "A 40-Gbit/s Optical Repeater Circuit using InAlAs/InGaAs HEMT Digital IC Chip Set", IEEE MTT-S Digest, WE1 D-2, 1997).

Problems in increasing the bit rate per wavelength include restrictions on the possible transmission distance by group velocity dispersion (GVD), restrictions on the input power to the optical fiber resulting from the nonlinear characteristic of optical fiber, and such like. Application of dispersion-compensating technology is effective in removing restrictions on the possible transmission distance. As for input power restrictions, RZ (return-to-zero) format has greater tolerance than NRZ (non-return-to-zero) format, which is conventionally used in optical transmission systems, and most reports of 40-Gbit/s single channel transmission experiments describe systems using RZ formats. CS (carrier-suppressed)-RZ format using an alternating phase-inverted pulse (Reference Document 2: Y. Miyamoto et al., OAA '99, PDP4-1), and DCS (duo-binary carrier suppressed)-RZ format (Reference Document 3: Y. Miyamoto et al., Dig. OFC'01, TuU4) are regarded as especially promising, since these RZ formats have comparatively lenient restrictions on the input power to optical fiber resulting from the nonlinear characteristic of the optical fiber, and on the possible transmission distance by group velocity dispersion.

One conventional method of creating CS-RZ and DCS-RZ formats uses a Mach-Zehnder optical modulator, and is comparatively easy to realize (see Reference Documents 2 and 3). According to the method which uses a Mach-Zehnder optical modulator, an alternating phase-inverted pulse is created by driving the optical modulator with a sine wave of half the frequency of the repetition frequency of the alternating phase-inverted pulse. The voltage applied to the optical modulator at this time is twice the half-wavelength voltage $V\pi$, which is the voltage required to maximize the on-off ratio of the optical modulator. The voltage value at which this sine wave voltage and the transmission loss of the optical modulator reach their maximums must be applied as a DC bias voltage.

However, since the Mach-Zehnder optical modulator utilizes light interference, the applied voltage characteristics of its output optical power (input-output characteristics) are known to fluctuate (Reference Document 4: Jumonji et al., Institute of Electronics, Information, and Communication Engineers, memoir C-1, J75-C-1, pp.17–26, 1992). In particular, "DC drift" is the term given to shifts in the input-output characteristics when a voltage is applied, and poses a significant problem in the practical use of the Mach-Zehnder optical modulator, which is manufactured from Z-cut $LiNbO_3$.

A circuit which detects fluctuation in the input-output characteristics, and feeds back the voltage applied to the optical modulator has been proposed and is in practical usage; this circuit is termed a bias voltage control circuit, since the DC component is usually cut from the data signal before applying it to the MZ-modulator (Reference Document 5: Japanese Patent No. 2642499, Reference Document 6: Japanese Patent No. 2866901, Japanese Patent No. 2869585, Reference Document 7: Japanese Patent Application, First Publication No. Hei 10-24874).

In "Optical Transmitter, Control Circuit for Optical Modulator and Optical Modulating Method" in Reference Document 5, a low-frequency signal is superimposed onto a data signal, drifts in the input-output characteristics are detected based on the level of the low-frequency signal, obtained by receiving part of the output of the optical modulator, and the direction of the drift is detected based on the phase of the low-frequency signal.

However, the method of Reference Document 5 assumes that the optical modulator is driven at a voltage of $V\pi$, the low-frequency signal component being cancelled during modulation at $2V\pi$; consequently, it is not possible to detect error signals or control the bias voltage.

"Optical Modulator Control Circuit" of Reference Document 7 differs from Reference Document 5 in that the low frequency signal is superimposed onto the bias voltage instead of a data signal; the detection of drift in input/output characteristics is substantially the same as in Reference Document 5.

However, in the method of Reference Document 7, the modulated signal is subjected to envelope detection, and therefore, the photoelectric converter, DC low frequency removing circuit, and the envelope curve detector circuit all require a band which is equal to or greater than the repetition frequency of the alternating phase-inverted pulse light. Therefore, considering application in a high-speed transmission system of 20 Gbit/s or more, in which, for example, CS-RZ and DCS-RZ formats are valid, the control circuit would be extremely expensive.

In "Optical Modulator Device" of Reference Document 6, in order to detect drift, a probe light different from the main signal light is input from the opposite direction into an optical modulator having a traveling-wave electrode (most high-speed Mach-Zehnder optical modulators are of this type). Drift is detected by utilizing the fact that light input from the opposite direction is not modulated.

However, Reference Document 6 requires a light source for detection, making this constitution comparatively expensive; in addition, in creating the alternating phase-inverted pulse light, the level of the probe light decreases in order to achieve a bias voltage which will minimize the output of the optical modulator, making detection difficult.

Furthermore, in a WDM transmission system, the probe light may cause noise for other channels, requiring sufficient care in selecting a wavelength for the probe light.

The object of the present invention is to provide an optical transmission circuit comprising an inexpensive bias control circuit which causes as little deterioration as possible in the main signal light, that is, the alternating phase-inverted pulse light.

SUMMARY OF THE INVENTION

An optical transmission circuit according to a first aspect of the present invention comprises an optical modulator which modulates continuous light at wavelength λo with a signal at repetition frequency fo Hz, and outputs alternating phase-inverted pulse light; a bias voltage applying unit which applies a bias voltage to the optical modulator; an optical power spectrum measuring unit having frequency resolution of less than fo Hz which measures the optical power spectrum of light output from the optical modulator; and a control circuit which controls the bias voltage via the bias voltage applying unit based on measurements of the power spectrum of the output light of the optical modulator, so as to minimize the power intensity of the carrier spectrum component of wavelength λo, or to maximize the power intensity of the spectrum component in both side bands.

According to the optical transmission circuit, the output light of the optical modulator which creates the alternating phase-inverted pulse light is monitored, and the bias voltage of the optical modulator is controlled so as to minimize the power intensity of the carrier spectrum component, or to maximize the power intensity of the carrier spectrum components in both side bands; consequently, the alternating phase-inverted pulse light can be output stably with an absolute minimum of loss.

The optical transmission circuit according to a second aspect of the present invention comprises an optical modulator which modulates continuous light at wavelength λo with a signal at repetition frequency fo Hz, and outputs alternating phase-inverted pulse light; a bias voltage applying unit which applies a bias voltage to the optical modulator; an RF spectrum extracting unit which converts the output light of the optical modulator to an electrical signal and extracts an RF spectrum at frequency fo Hz from the electrical signal; and a control circuit which controls the bias voltage via the bias voltage applying unit so as to minimize the RF spectrum component.

The optical transmission circuit according to a third aspect of the present invention comprises an optical modulator which modulates continuous light at wavelength λo with a signal at repetition frequency fo Hz, and outputs alternating phase-inverted pulse light; a bias voltage applying unit which applies a bias voltage to the optical modulator; an RF spectrum extracting unit which converts the output light of the optical modulator to an electrical signal and extracts an RF spectrum at frequency fo Hz from the electrical signal; and a control circuit which controls the bias voltage via the bias voltage applying unit so as to maximize the RF spectrum component.

According to the optical transmission circuit in the third aspect of the present invention, the optical transmission circuit comprises an optical modulator which modulates continuous light at wavelength λo with a signal at repetition frequency fo Hz, and outputs alternating phase-inverted pulse light; a bias voltage applying unit which applies a bias voltage to the optical modulator; an optical filter which extracts a carrier spectrum component at wavelength λo from the output light of the optical modulator; a photoelectric converter which converts light of the carrier spectrum component to an electrical signal; and a control circuit which controls the bias voltage via the bias voltage applying unit so as to minimize the power of the electrical signal.

The optical filter may comprise one selected from: a pass-type narrow-band optical filter which passes the carrier spectrum component of wavelength λo, a reflecting-type narrow-band optical filter which reflects the carrier spectrum component of wavelength λo, and a periodic narrow-band optical filter having periodic characteristics in the pass (or reflection) band which selectively blocks both side band spectra components of the output light of the optical modulator, while extracting a carrier spectrum component.

The optical transmission circuit according to another aspect of the present invention comprises an optical modulator which modulates continuous light at wavelength λo with a signal at repetition frequency fo Hz, and outputs alternating phase-inverted pulse light; an optical filter which extracts from the output light of the optical modulator frequency a spectrum component which has deviated to the longer-wavelength side or shorter-wavelength side by frequency fo Hz with respect to wavelength λo; a photoelectrical converter which converts the spectrum component light to an electrical signal; and a control circuit which controls the bias voltage via the bias voltage applying unit so as to maximize the power of the electrical signal.

The optical filter may comprise one selected from a pass-type narrow-band optical filter which passes a spectrum component which has deviated to the longer-wavelength side or shorter-wavelength side by frequency fo Hz with respect to wavelength λo; a reflecting-type narrow-band optical filter which reflects a spectrum component which has deviated to the longer-wavelength side or shorter-wavelength side by frequency fo Hz with respect to wavelength λo; and a periodic narrow-band optical filter which has periodic characteristics in the pass (reflection) band, the pass (reflection) wavelength having deviated to the longer-wavelength side or shorter-wavelength side by frequency fo Hz with respect to wavelength λo, and selectively stops the carrier spectrum component of the optical modulator while extracting the spectrum component in both side bands.

The optical filter may comprise a wavelength-variable filter which allows the pass band and reflecting band to be varied. In this case, the control circuit may control the bias voltage via the bias voltage applying unit so as to minimize or maximize the power of the electrical signal while varying the pass (or reflection) band of the optical filter.

The reflecting-type narrow-band optical filter may comprise a fiber grating, and light passing through the fiber grating may be the output light of the optical transmission circuit.

The periodic narrow-band optical filter may comprise a filter which isolates pass wavelength light and stops wavelength light at two output ports. In this case, the photoelectric converter may be connected to the output port which outputs the pass wavelength light, and the output port which outputs the stop wavelength light may become the output port of the optical transmission circuit.

The optical filter may comprise a pass-type narrow-band optical filter or a periodic narrow-band optical filter which passes a spectrum component which has deviated to the longer-wavelength side or shorter-wavelength side by frequency fo Hz with respect to wavelength λo; the pass light may be branched into two and input to the photoelectric converter, becoming the output light of the optical transmission circuit.

The optical filter may comprise a dispersive medium for compensating the dispersion of optical transmission link.

In the optical transmission circuit, part of the light output from the laser light source may be branched to the reflecting-type narrow-band optical filter which reflects the carrier spectrum of the wavelength λo; the control circuit may control the wavelength of the light source so as to maximize the power intensity of the reflected carrier spectrum component.

In the optical transmission circuit, instead of inputting the continuous light at wavelength λo to the optical modulator, the continuous light at wavelength λo may be input to a modulating unit which modulates it based on a data signal, the light output from the modulating unit being input to the optical modulator, or the light output from the optical modulator being input to the modulating unit.

BRIEF DESCRIPTION OF THE DRAWINGS

FIG. 1 is a block diagram showing a first embodiment of an optical transmission circuit of the present invention;

DESCRIPTION OF THE PREFERRED EMBODIMENTS

Embodiments of the present invention will be explained based on the drawings, although the invention is not limited to these embodiments. For example, the constitutions of the following embodiments may be combined together, or combined with a conventionally known constitution.

First Embodiment

FIG. 1 is a block diagram showing a first embodiment of the optical transmission circuit of the present invention. In FIG. 1, a laser light source 11 outputs continuous light at a wavelength λo to a Mach-Zehnder (branch interference-type) modulator 12. In this example, a Mach-Zehnder (MZ) modulator is used as the optical modulator, but the present invention allows the use of other types of optical modulators.

The Mach-Zehnder optical modulator 12 comprises a pair of electrodes 12A, which are provided in correspondence with two optical paths for branching and interfering with light from the laser light source 11; input light can be modulated by a push-pull operation of inputting to the electrodes 12A.

Input signals 1 and 2 are applied to the electrodes 12A of the Mach-Zehnder optical modulator 12, and form a sine wave of repetition frequency fo Hz, the phases of the inputs signals being mutually inverted. Capacitors 13 and a bias-T 15 are connected to the electrodes 12A of the Mach-Zehnder optical modulator 12, and a bias voltage is applied via the bias-T 15 from a bias voltage applying unit.

A method for creating alternating phase-inverted pulse light by using the push-pull electrode type Mach-Zehnder optical modulator 12 will be explained. Optical signals created by the push-pull electrode type Mach-Zehnder optical modulator 12 are known to be "chirpless", i.e. phase does not change in correspondence with changes in intensity. Since alternating phase-inverted pulse light should preferably be chirpless, the push-pull type optical modulator is generally used. A Mach-Zehnder optical modulator provided on an $LiNbO_3$ X-cut substrate, a semiconductor, or polymer, can generate a chirpless alternating phase-inverted pulse with a single electrode, and in this case there is only one input signal.

The continuous light at wavelength λo is input to the Mach-Zehnder optical modulator 12, and modulated by the fo Hz sine wave, which is applied to the two electrodes. The amplitude of the sine wave is voltage Vπ, this being one half-wavelength of the optical modulator, and the sine wave is applied in inverted phase. The bias voltage applied to the optical modulator from the bias voltage applying unit 14 is set so as to minimize the transmission factor of the modulator. When the constitution of the circuit satisfies these conditions, it generates an alternating phase-inverted pulse at a repetition frequency 2fo Hz.

Figure 2A:
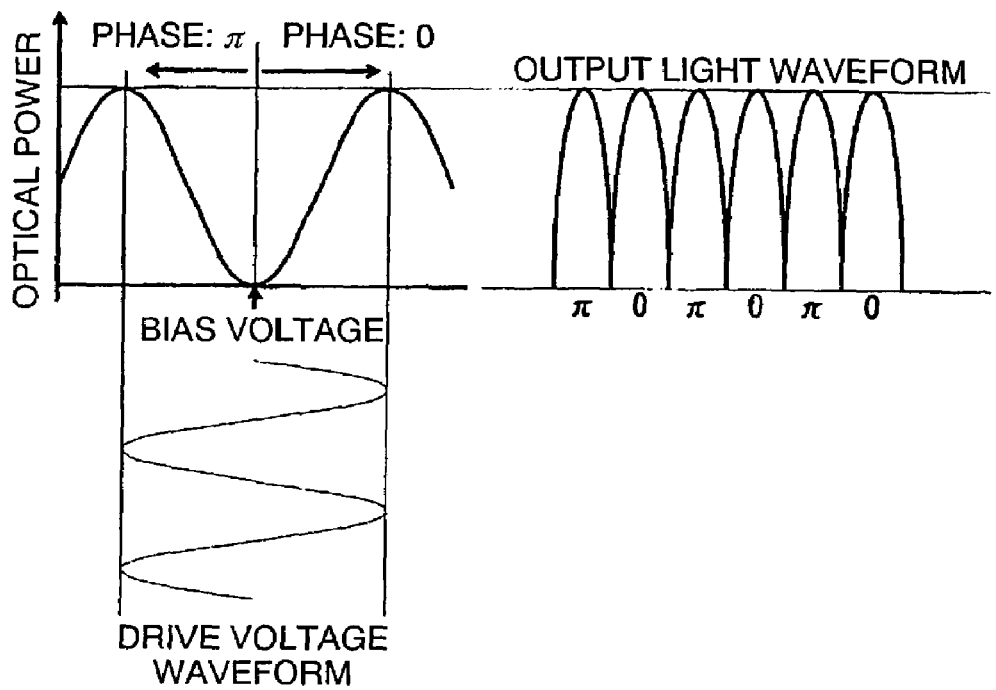
FIGS. 2A and 2B are diagrams showing input/output characteristics of a Mach-Zehnder (MZ) modulator 12.
Figure 2B:
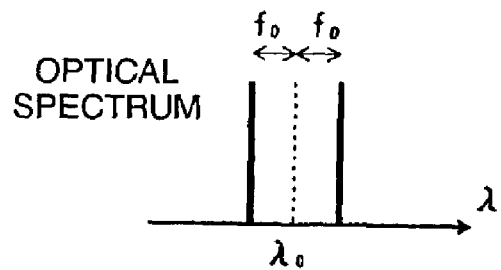

FIG. 2A shows input/output characteristics of the Mach-Zehnder optical modulator 12. The phase of the optical output inverts at the point where the transmission factor reaches its minimum. FIG. 2B shows the optical spectra of the alternating phase-inverted pulse light at this time. The alternating phase-inverted pulse light does not contain the carrier component of the continuous light, input to the Mach-Zehnder optical modulator 12 from the laser light source 11, but has line spectra on the fo Hz long-wavelength side and fo Hz short-wavelength side of the central wavelength of the light source.

Figure 3A:
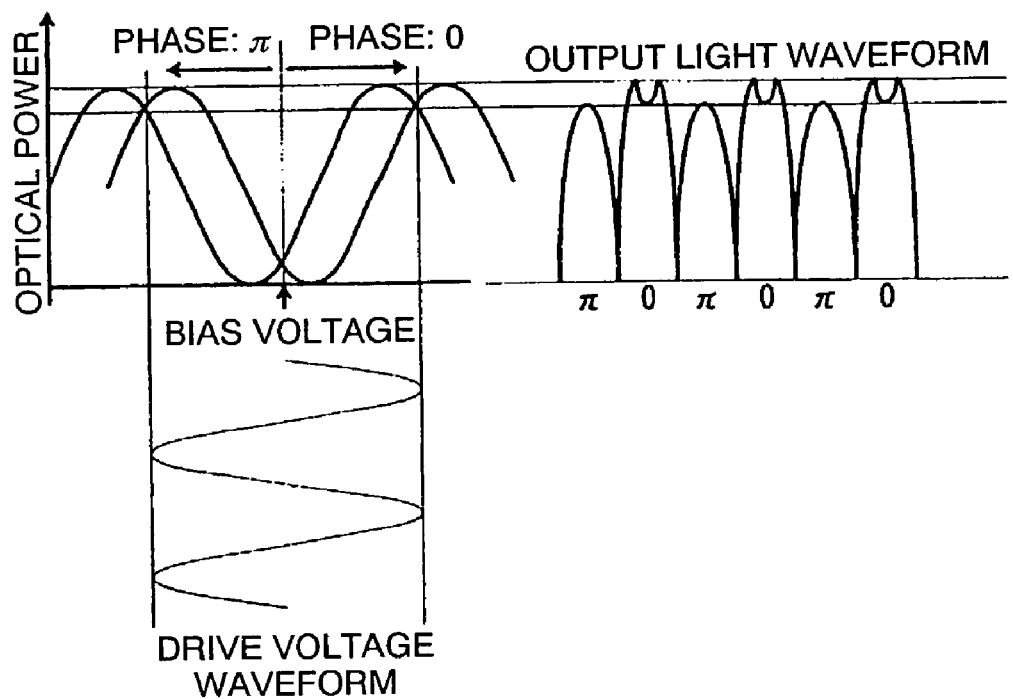
FIGS. 3A and 3B are diagrams showing input/output characteristics when the bias voltage has deviated from its optimum value.
Figure 3B:
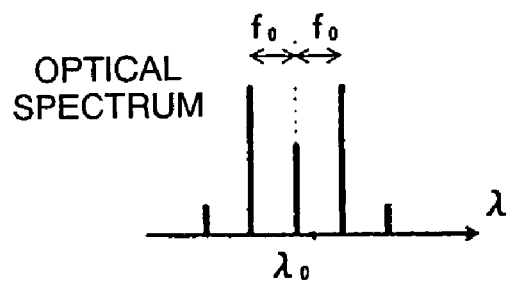

When the optimum bias voltage has deviated from its initial value due to DC drift and the like, the level of the alternating phase-inverted pulse light has highs and lows, as shown in FIG. 3A. As shown in FIG. 3B, a line spectrum of the carrier component is generated in the center of the optical spectrum. At the optimum bias voltage, no carrier component is generated, since the pulse with phase π and the zero-phase pulse cancel each other out; however, when the bias voltage deviates from its optimum value, highs and lows appear in the pulse and are not cancelled out, but remain as a carrier component.

Figure 4:
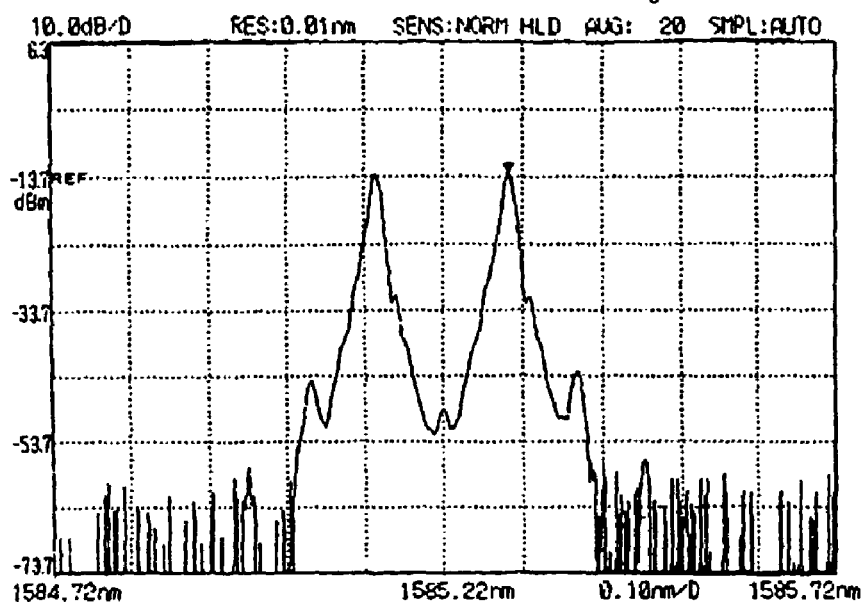
FIG. 4 is a graph showing the optical spectrum of alternating phase-inverted pulse light.

Since the bias voltage deviates from the optimum bias point, thereby generating highs and lows in the pulse, the fo Hz frequency component is superimposed onto the pulse signal. When the bias voltage is set to its optimum value, the fo Hz component is minimized. FIG. 4 shows measurements obtained when alternating phase-inverted pulse light of fo=10 GHz was measured by using an optical spectrum analyzer.

Figure 5:
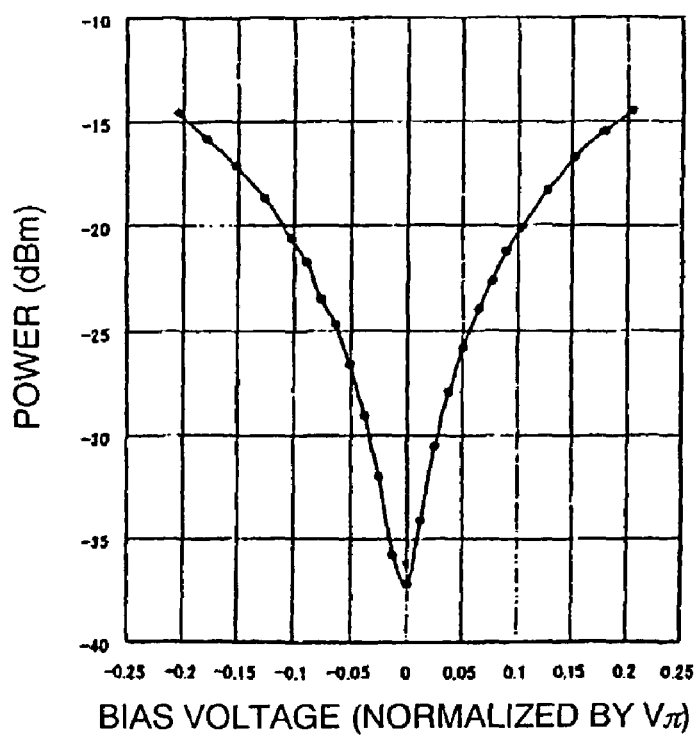
FIG. 5 is a graph showing bias voltage dependency of the carrier component of alternating phase-inverted pulse light.
Figure 6:
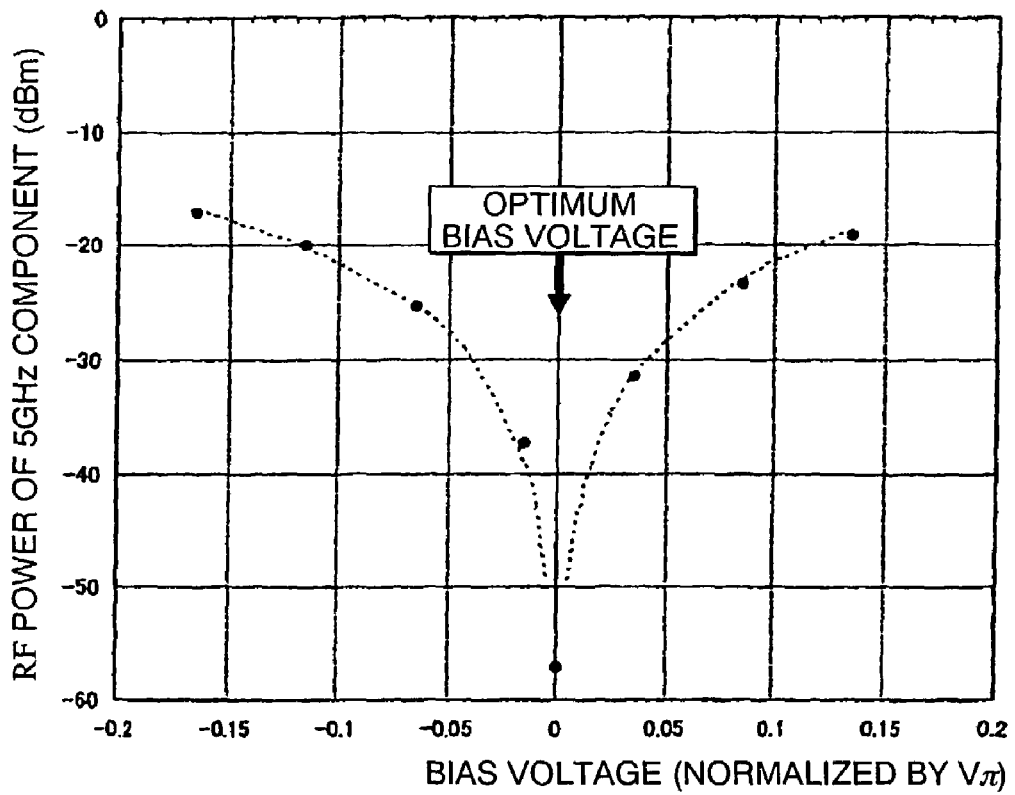
FIG. 6 is a graph showing bias voltage dependency of the RF power of the fo component of alternating phase-inverted pulse light.

FIG. 5 shows test results measured by an optical power meter after using a narrow-band optical filter to selectively extract the line spectra of the carrier component, and then change the bias voltage. FIG. 6 shows measurements of a 5 GHz RF power spectrum obtained by an RF spectrum analyzer when the alternating phase-inverted pulse light of fo= 5 GHz was detected by using a wide-band photoelectric converter. In each case, it can be seen that the fo Hz component is at its minimum at the optimum bias voltage. That is, spectra power in both side bands reaches a maximum at the optimum bias voltage, and the RF spectra has its maximum at the repetition frequency (2fo Hz) of the alternating phase-inverted pulse light.

Considering the above points, the present invention measures the optical spectra of light output from the Mach-Zehnder optical modulator 12, and controls the bias point so as to minimize the power density of the carrier spectrum component of wavelength λo. In the first embodiment shown in FIG. 1, part of the light output from the Mach-Zehnder optical modulator 12 is branched by an optical branch unit 16 and input to an optical power spectrum measuring unit 17. A commercially available optical spectrum analyzer with wavelength (optical frequency) resolution of less than fo Hz can be used as the optical power spectrum measuring unit 17.

The optical power spectrum measuring unit 17 extracts only the carrier spectrum component (wavelength λo) from the light output from the optical modulator at a wavelength resolution of less than fo Hz, and outputs a DC voltage signal proportionate to the power density of the extracted component to a control circuit 18. The control circuit 18 outputs a control signal to the bias voltage applying unit 14 so as to minimize the power density of the carrier spectrum component, and the bias voltage of the optical modulator is controlled accordingly. By this type of bias voltage control, alternating phase-inverted pulse light is output from the Mach-Zehnder optical modulator 12.

The bias voltage of the optical modulator may be controlled by having the control circuit 18 output a control signal to the bias voltage applying unit 14 so as to maximize the power density in both side bands. This obtains the same effects.

Second Embodiment

Figure 7:
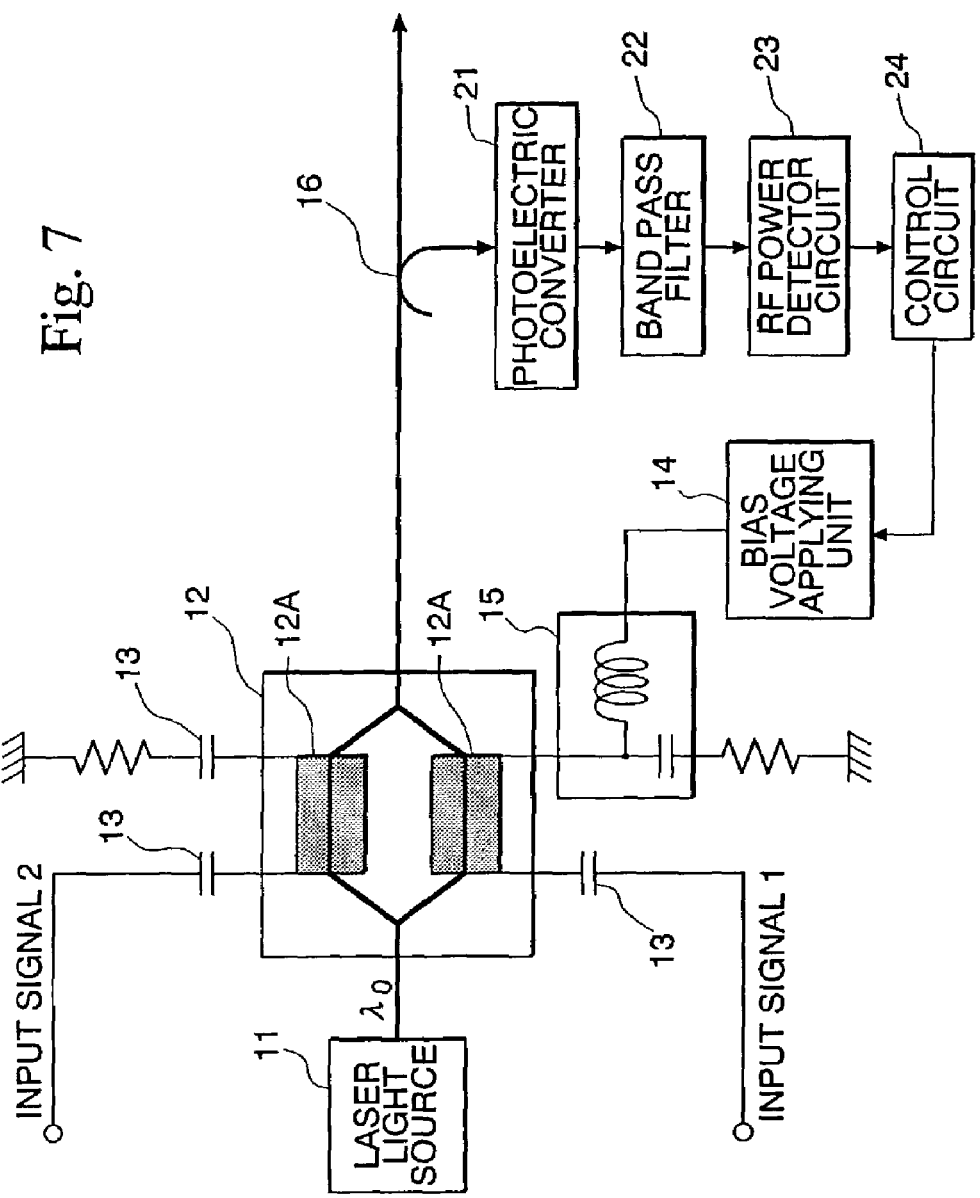
FIG. 7 is a block diagram showing a second embodiment of the optical transmission circuit of the present invention.

FIG. 7 shows a second embodiment of an optical transmission circuit of the present invention. This embodiment is characterized in that it uses a photoelectric converter 21, a band pass filter 22, and an RF power detector circuit 23, instead of the optical power spectrum measuring unit 17 of the first embodiment shown in FIG. 1. Otherwise, the constitution is the same as that of the first embodiment.

The optical branch unit 16 branches part of the light output from the Mach-Zehnder optical modulator 12, and the photoelectric converter 21 converts this light to an electrical signal; the band pass filter 22 extracts the RF component at frequency fo Hz and inputs it to the RF power detector circuit 23. The RF power detector circuit 23 applies a DC voltage proportionate to the input RF power to the control circuit 24. The control circuit 24 outputs a control signal to the bias voltage applying unit 14 so as to minimize the input DC voltage, and the bias voltage of the optical modulator is controlled accordingly.

Alternatively, the RF component at frequency 2fo Hz is extracted by the band pass filter 22, the control circuit 24 outputs a control signal to the bias voltage applying unit 14 so as to maximize the RF power, and the bias voltage of the optical modulator is controlled accordingly.

Third Embodiment

Figure 8:
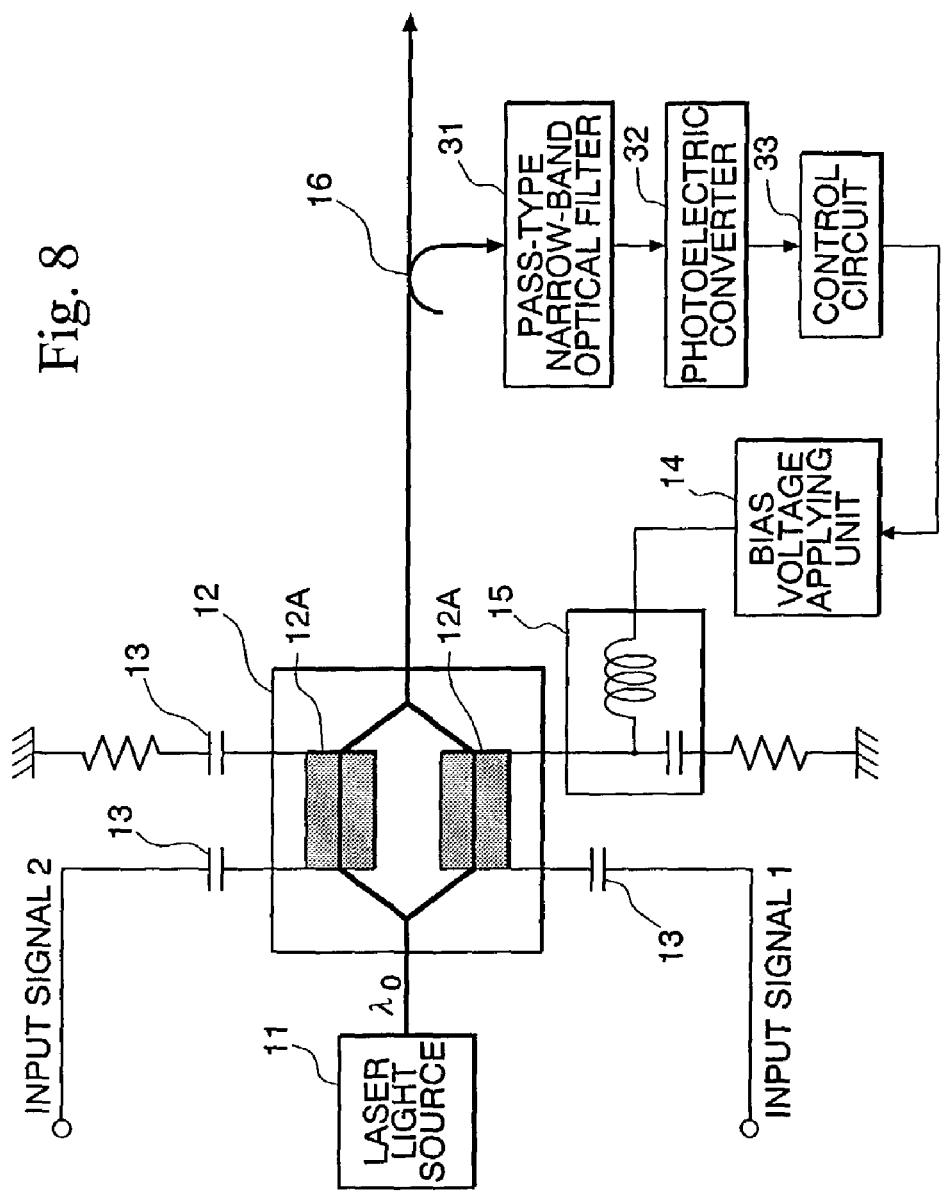
FIG. 8 is a block diagram showing a third embodiment of the optical transmission circuit of the present invention.

FIG. 8 shows a third embodiment of the optical transmission circuit of the present invention. This embodiment is characterized in that it uses a pass-type narrow-band optical filter 31 and a photoelectric converter 32, instead of the optical power spectrum measuring unit 17 of the first embodiment shown in FIG. 1. Otherwise, the constitution is the same as that of the first embodiment.

The central wavelength of the pass-band of the pass-type narrow-band optical filter 31 is equal to the wavelength λo of the laser light source 11; the 20 dB down pass-bandwidth is fo Hz and less, cutting-off both side band spectra of the alternating phase-inverted pulse light. Using this pass-type narrow-band optical filter 31, the carrier spectrum component (wavelength λo) is extracted from the light output from the Mach-Zehnder optical modulator 12, the photoelectric converter 32 converts this to a DC voltage which is input to the control circuit 33. The control circuit 33 outputs a control signal to the bias voltage applying unit 14 so as to minimize the input DC voltage, and the bias voltage of the optical modulator is controlled accordingly.

Alternatively, the pass-type narrow-band optical filter 31 may be used to extract only one of the spectra components on each side band from the light output from the Mach-Zehnder optical modulator 12, and the control circuit 33 outputs a control signal to the bias voltage applying unit 14 so as to maximize the DC voltage, and the bias voltage of the optical modulator is controlled accordingly.

In the second embodiment, the band of the photoelectric converter 21 must be greater than fo Hz; in contrast, since the photoelectric converter 32 of this embodiment need only detect the DC component, an inexpensive photoelectric converter such as a photodiode can be used.

Figure 9:
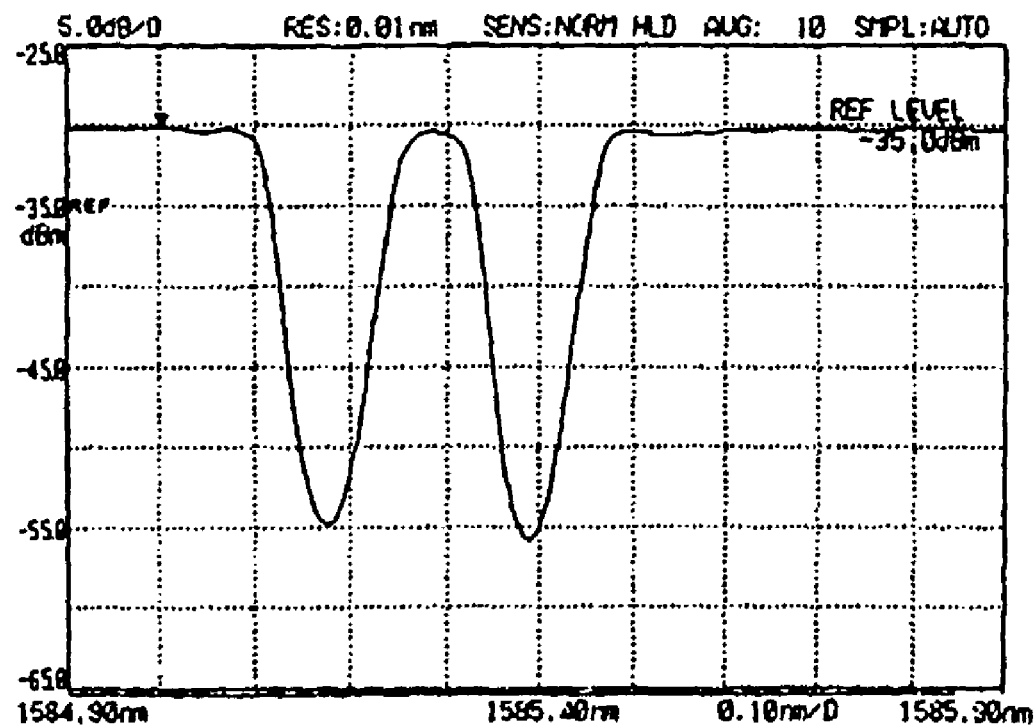
FIG. 9 is a graph showing example measurement of pass characteristics of a pass-type narrow-band optical filter 31.

FIG. 9 shows measurements of the pass-band of the pass-type narrow-band optical filter 31 as an example of an optical filter. Here, the optical filter comprises two fiber gratings in tandem connection. In this example, fo=10 GHz.

Since the pass-type narrow-band optical filter required in this embodiment should be able to stop spectra in both side bands while allowing the carrier component to pass, a periodic filter can be used. The cycle of the periodic filter should preferably be 2fo Hz, but this need not be strictly adhered to, it being necessary only that spectra can be stopped in both side bands. Alternatively, the carrier component may be stopped and both side bands allowed to pass, so that the total spectra power in both side bands reaches it maximum.

Fourth Embodiment

Figure 10:
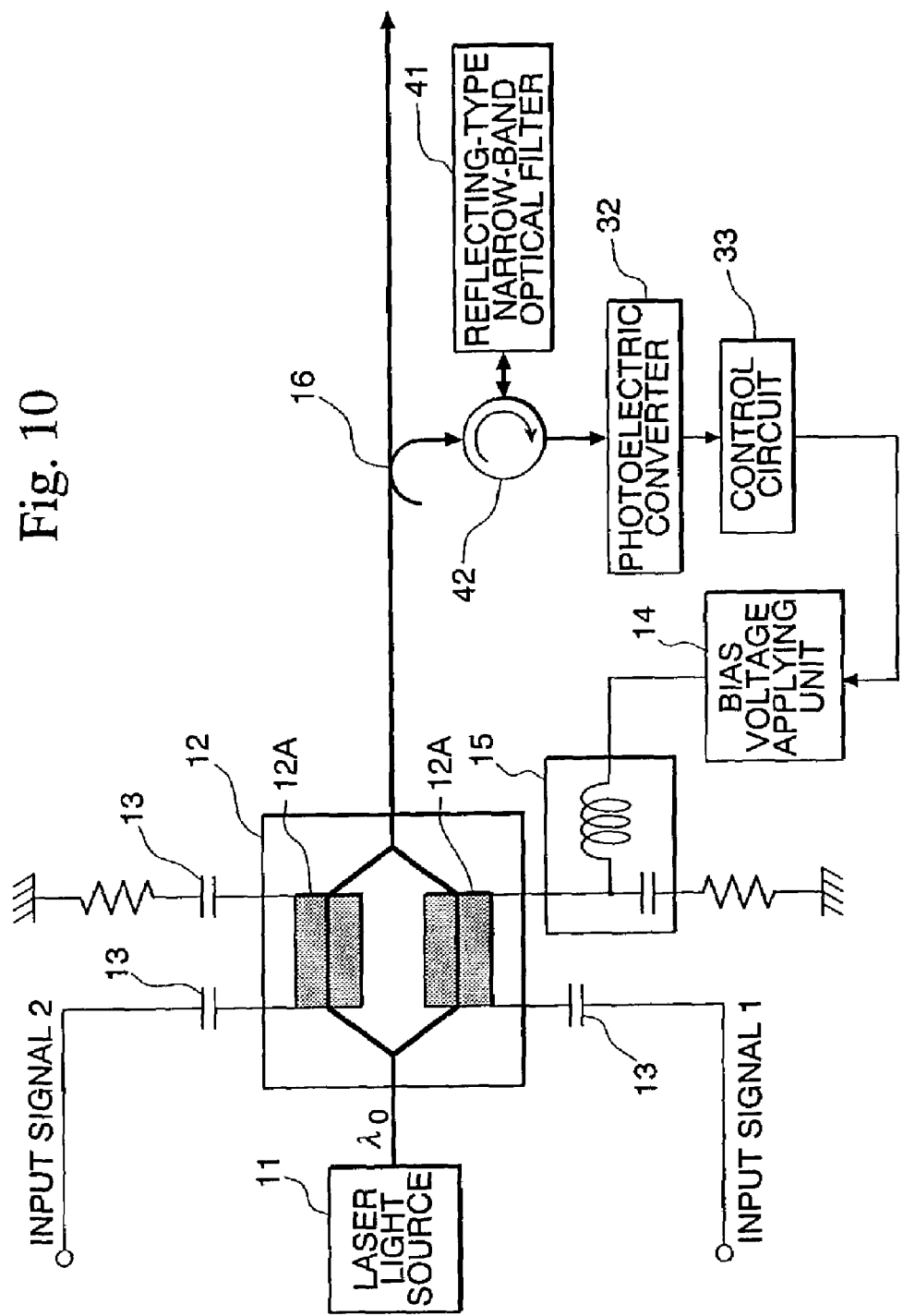
FIG. 10 is a block diagram showing a fourth embodiment of the optical transmission circuit of the present invention.

FIG. 10 shows a fourth embodiment of the optical transmission circuit of the present invention. This embodiment is characterized in that it uses a reflecting-type narrow-band optical filter 41, instead of the pass-type narrow-band optical filter 31 of the third embodiment. Otherwise, the constitution is the same as that of the first embodiment.

The reflecting-type narrow-band optical filter 41 is connected via an optical circulator 42 to the optical branching unit 16 and the photoelectrical converter 32. A fiber grating or the like may, for example, be used as the reflecting-type narrow-band optical filter 41 of this embodiment. Alternatively, a filter having periodic reflective characteristics may be used as the reflecting-type narrow-band optical filter 41.

Fifth Embodiment

Figure 11:
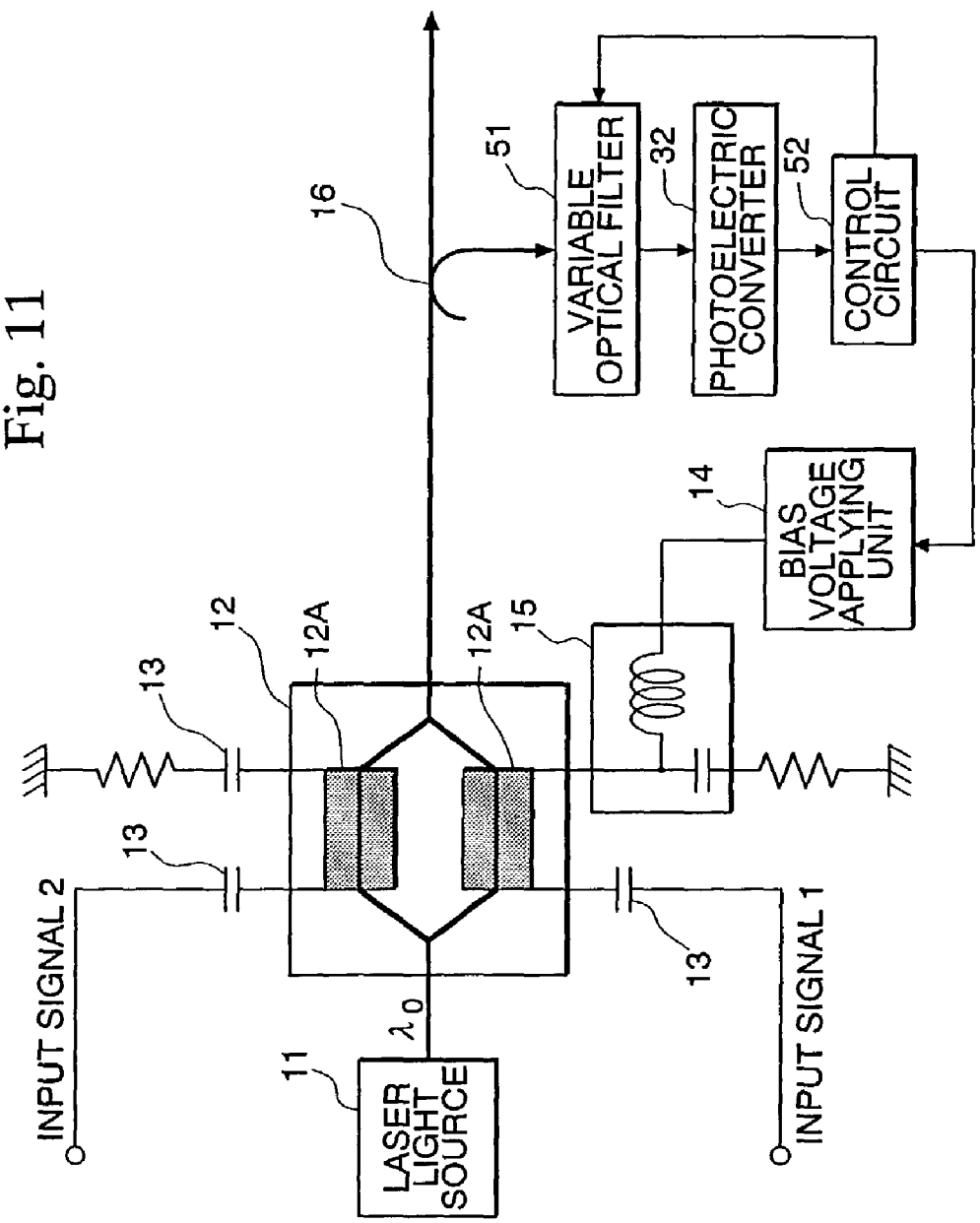
FIG. 11 is a block diagram showing a fifth embodiment of the optical transmission circuit of the present invention.

FIG. 11 shows a fifth embodiment of the optical transmission circuit of the present invention. This embodiment is characterized in that it uses a variable optical filter 51 instead of the pass-type narrow-band optical filter 31 of the third embodiment (and the reflecting-type narrow-band optical filter 41 and optical circulator 42 of the fourth embodiment); optical power is measured while changing the pass band by using a control signal from a control circuit 52.

The variable width of the pass band of the variable optical filter 51 should be 3fo Hz+the long-term stable portion of the laser (approximately ±20 GHz in a LD for DWDM). The optical power achieves its maximum value twice in the variable widths; this is because the variable optical filter 51 captures the two side band spectra of the alternating phase-inverted pulse light one by one. A control signal may be output to the bias voltage applying unit 14 to minimize the optical power at these two intermediate points, with the bias voltage of the optical modulator being controlled accordingly. Alternatively, the bias voltage may be controlled so that the peak value reaches its maximum at one of the two points.

Sixth Embodiment

Figure 12:
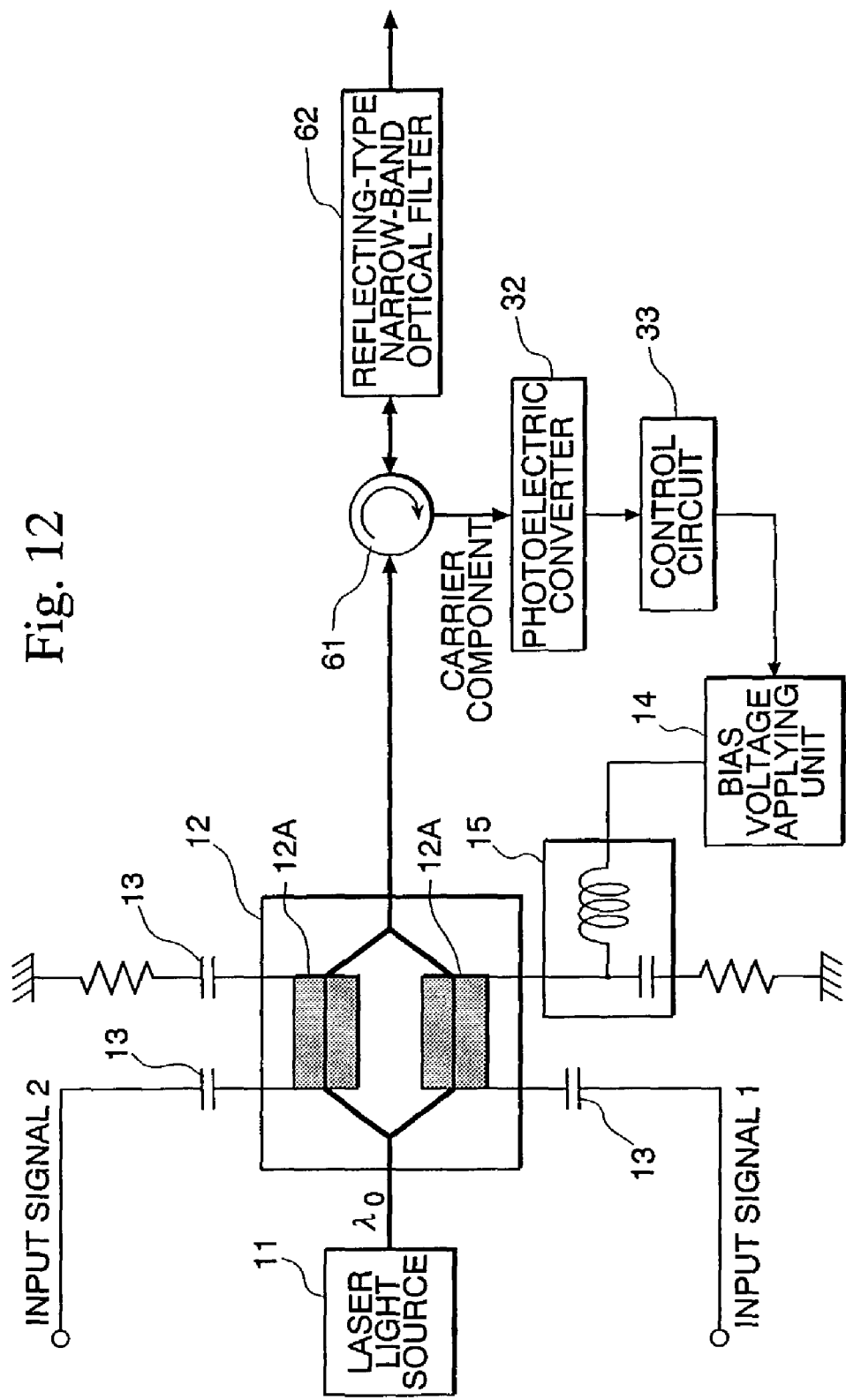
FIG. 12 is a block diagram showing a sixth embodiment of the optical transmission circuit of the present invention.
Figure 13:
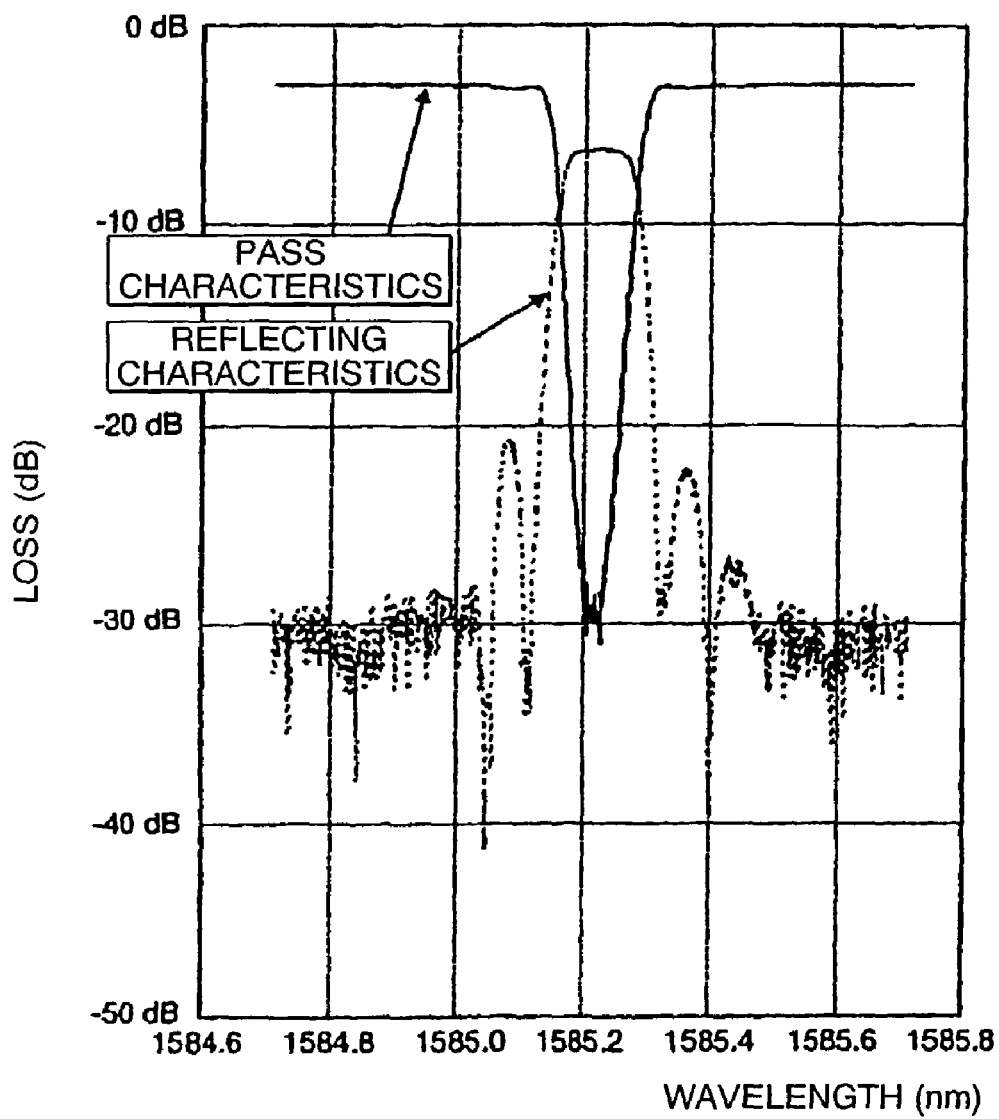
FIG. 13 is a graph showing pass and reflection characteristics of a fiber grating.

FIG. 12 shows a sixth embodiment of the optical transmission circuit of the present invention. This embodiment is characterized in that it uses an optical circulator 61 and a reflecting-type narrow-band optical filter 62, instead of the optical branching unit 16 and the pass-type narrow-band optical filter 31 of the third embodiment. The light output from the Mach-Zehnder optical modulator 12 is directed via the optical circulator 61 into the reflecting-type narrow-band optical filter 62, and the reflected carrier component is input to the photoelectric converter 32 via the optical circulator 61. FIG. 13 shows an example of pass characteristics and reflecting characteristics of a fiber grating used as the reflecting-type narrow-band optical filter 62. Here, fo=20 GHz or more.

This embodiment is mechanically identical to the fourth embodiment; however, since the carrier component can be deleted from the output light at the same time as extracting the carrier component and controlling the bias, the quality of the output light does not deteriorate even when, for instance, the bias voltage deviates from its optimum point.

Seventh Embodiment

Figure 14:
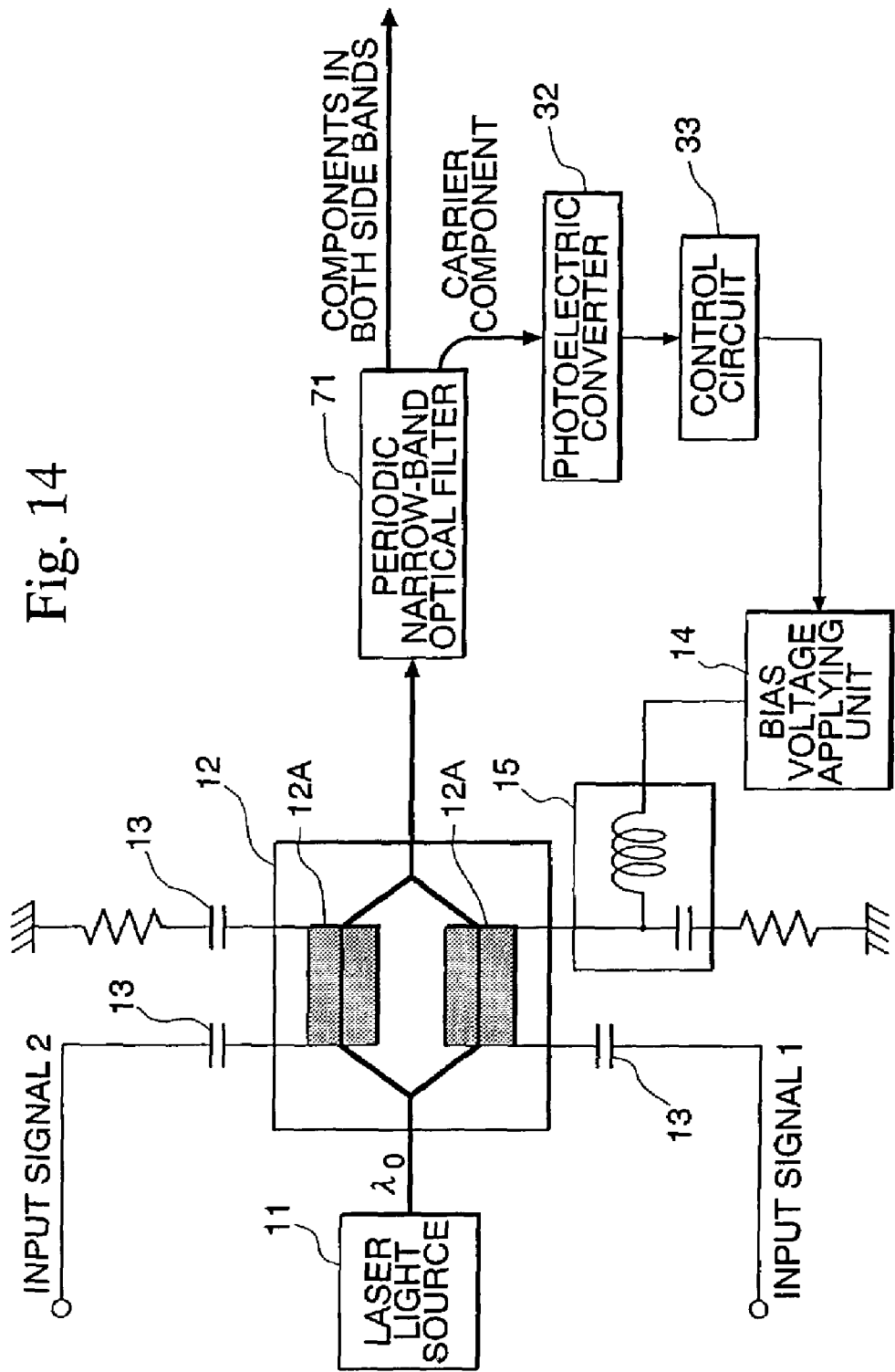
FIG. 14 is a block diagram showing a seventh embodiment of the optical transmission circuit of the present invention.

FIG. 14 shows a seventh embodiment of the optical transmission circuit of the present invention. This embodiment is characterized in that it uses a periodic narrow-band optical filter 71, instead of the optical circulator 61 and a reflecting-type narrow-band optical filter 62 of the sixth embodiment. Otherwise, the constitution is the same as that of the embodiments described already.

A two-port filter, such as a Mach-Zehnder type interferometer filter or a directional coupler type filter, can be used as the periodic narrow-band optical filter 71. In this case, the carrier component can be extracted from one of the ports and used in bias control, enabling light with the carrier component deleted therefrom to be extracted from the other port.

Eighth Embodiment

Figure 15:
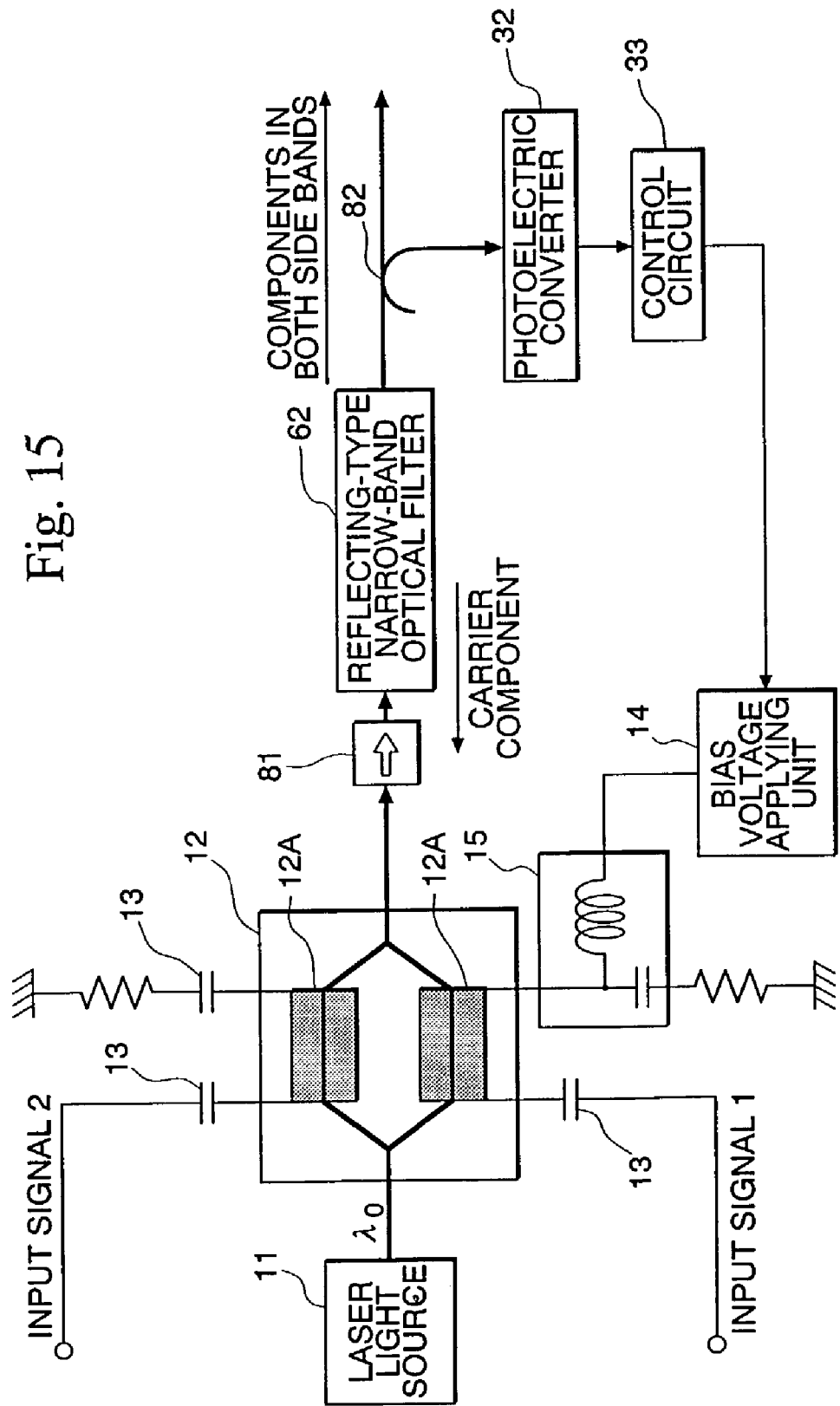
FIG. 15 is a block diagram showing an eighth embodiment of the optical transmission circuit of the present invention.

FIG. 15 shows an eighth embodiment of the optical transmission circuit of the present invention. In the sixth embodiment, the carrier component reflected by the reflecting-type narrow-band optical filter 62 was input to the photoelectric converter 32 via the optical circulator 61. In the eighth embodiment, the carrier component reflected by the reflecting-type narrow-band optical filter 62 is cut off by an optical isolator 81, so that the light passing through the reflecting-type narrow-band optical filter 62 becomes the output light; in addition, part of the output light is branched by an optical branching unit 82 and input to the photoelectric converter 32. Otherwise, the constitution is the same as that of the embodiments described already.

FIG. 13 shows an example of pass characteristics and reflecting characteristics of a fiber grating used as the reflecting-type narrow-band optical filter 62.

In the sixth embodiment, the bias voltage was controled so as to minimize the power of the carrier component reflected by the reflecting-type narrow-band optical filter 62; in this embodiment, the bias voltage is controlled so as to maximize the power of the components in both side bands which pass reflecting-type narrow-band optical filter 62.

In the sixth and eighth embodiments, a fiber grating is used as the reflecting-type narrow-band optical filter 62, and light which passes through the fiber grating (both side bands) becomes the output light. Therefore, by using a fiber grating having dispersion characteristics while setting the dispersion value so as to compensate for any dispersion along the optical transmission path, it becomes possible to compensate for dispersion on the optical transmission path by using the constitutions of FIGS. 12 and 15.

Ninth Embodiment

Figure 16:
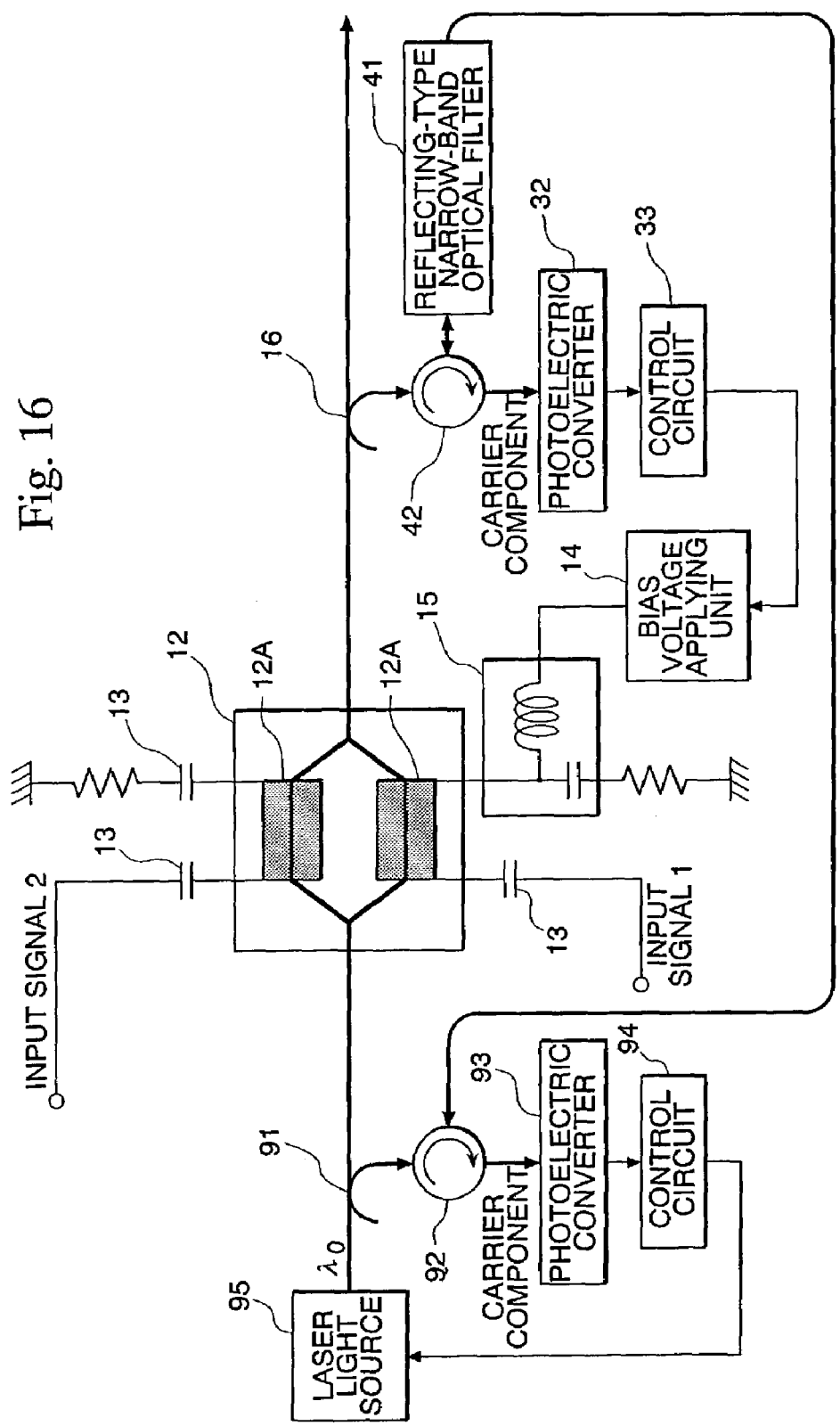
FIG. 16 is a block diagram showing a ninth embodiment of the optical transmission circuit of the present invention.

FIG. 16 shows a ninth embodiment of the optical transmission circuit of the present invention. This embodiment is characterized in that it uses the reflecting-type narrow-band optical filter 41 of the fourth embodiment to extract the carrier component from the output light in order to control the bias voltage, and the light source wavelength $\mu$o is controlled so that it exactly matches the reflection wavelength. The laser light source 95 must be one where the wavelength $\lambda$o can be controlled; this is accomplished by controlling the temperature of, for example, a DBR laser or a DFB laser. Part of the continuous light at wavelength $\lambda$o output from the laser light source 95 is branched by the optical branching unit 91, and input to the reflecting-type narrow-band optical filter 41 via the optical circulator 92; the reflected light is input to the photoelectric converter 93 via the optical circulator 92. The control circuit 94 controls the laser light source 95 so as to maximize the output voltage of the photoelectric converter 93. As a result, the same optical filter can be used to extract the carrier component for controlling the bias voltage and extract the carrier component for controlling the light source wavelength, enabling both to be matched.

Tenth Embodiment

Figure 17:
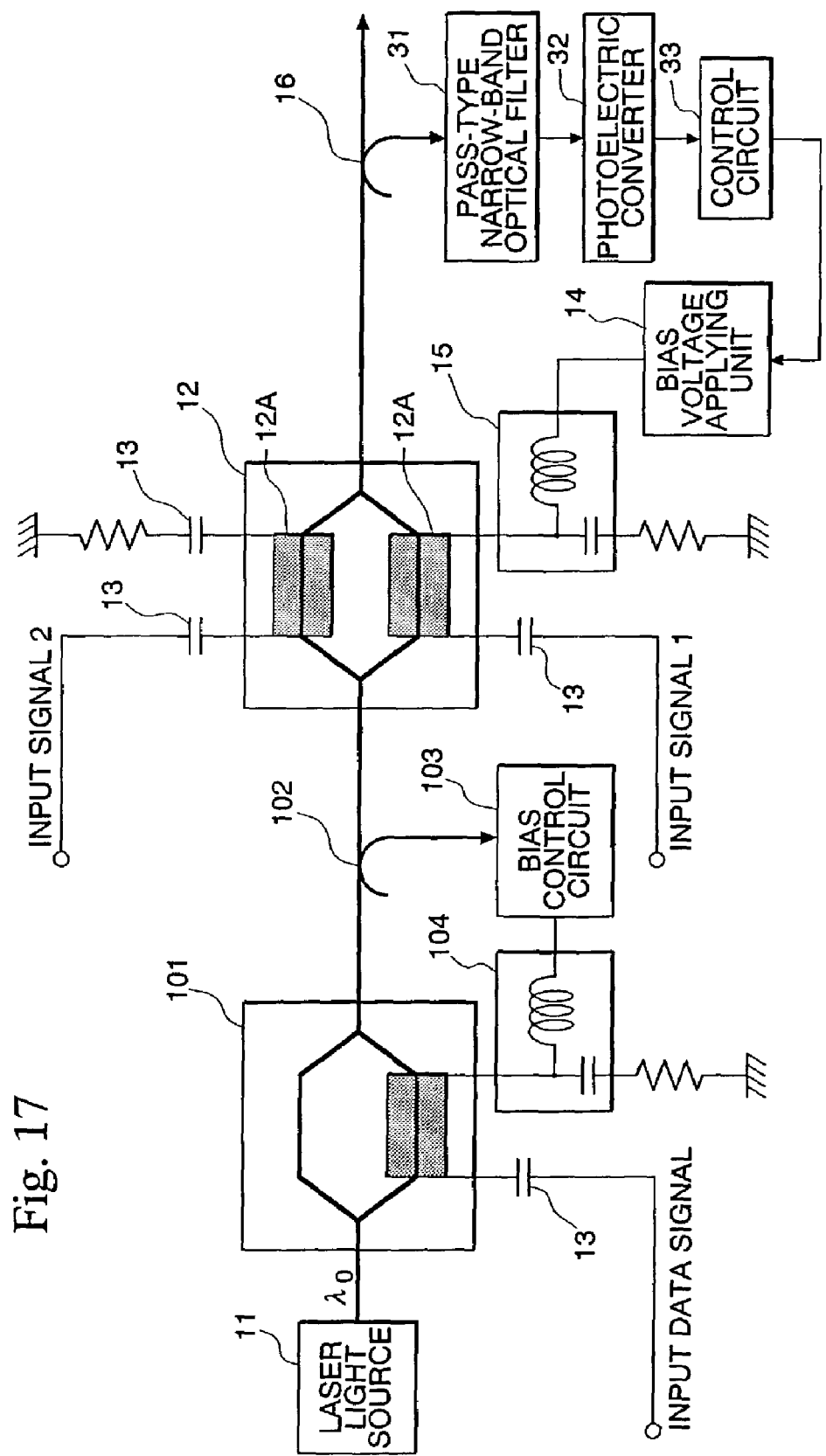
FIG. 17 is a block diagram showing a tenth embodiment of the optical transmission circuit of the present invention.

FIG. 17 shows a tenth embodiment of the optical transmission circuit of the present invention. This embodiment is characterized in that an optical modulating unit for modulating data signals is provided between the laser light source 11 of the first to eighth embodiments and the Mach-Zehnder optical modulator 12. The optical modulating unit comprises a Mach-Zehnder type modulator 101, an optical branching unit 102, a bias control circuit 103, and a bias-T 104. In the example shown, the constitution for controlling the bias voltage of the. Mach-Zehnder optical modulator 12 which creates the alternating phase-inverted pulse light is that of the third embodiment, but one of the other embodiments may be used instead. This embodiment may be combined with the ninth embodiment.

What is claimed is:
1. An optical transmission circuit comprising:
an optical modulator which modulates continuous light at wavelength $\lambda$o as a carrier wavelength with a signal as a modulating signal at repetition frequency of fo Hz, and outputs alternating phase-inverted pulse light having power spectrum components of both side bands which have deviated by fo Hz to longer wavelength or shorter wavelength by fo Hz;

a bias voltage applying unit which applies a bias voltage to the optical modulator;

an optical power spectrum measuring unit having frequency resolution of less than fo Hz which measures the optical power spectrum of light output from the optical modulator; and a control circuit which controls the bias voltage via the bias voltage applying unit based on measurements of the power spectrum of the output light of the optical modulator, so as to remove the carrier spectrum component of the carrier wavelength for maximizing the intensity of the power spectrums of both side bands.

2. An optical transmission circuit comprising:

an optical modulator which modulates continuous light at wavelength λo as a carrier wavelength with a signal as a modulating signal at repetition frequency of fo Hz, and outputs alternating phase-inverted pulse light having power spectrum components of both side bands deviated by fo Hz to longer wavelength side and to fo Hz shorter wavelength side from the carrier wavelength;

a bias voltage applying unit which applies a bias voltage to the optical modulator;

an optical power spectrum measuring unit having frequency resolution of less than fo Hz and having an RF spectrum extracting unit which converts the output light of the optical modulator to electrical signal and extracts RF spectrums of the carrier wavelength and at frequency of fo Hz;

a control circuit which controls the bias voltage via the bias voltage applying unit based on measurements of the power spectrum of the output light of the optical modulator, so as to remove the spectrum component of the carrier wavelength for maximizing the intensity of the spectrum components of both side bands.

3. The optical transmission circuit according to claim 2, wherein the optical power spectrum measuring unit has an RF spectrum extracting unit which converts the output light of the optical modulator to an electrical signal and extracts RF spectrums at the carrier wavelength and the spectrums at higher side band of 2fo Hz from the electrical signal; and the control circuit controls the bias voltage via the bias voltage applying unit so as to remove the RF spectrum component at the carrier wavelength for maximizing the intensity of the high side band spectrums.

4. An optical transmission circuit comprising:

an optical modulator which modulates continuous light at wavelength λo as a carrier wavelength with a signal as a modulating signal at repetition frequency of fo Hz, and outputs alternating phase-inverted pulse light having power spectrum components of both side bands deviated by fo Hz to longer wavelength side and to fo Hz shorter wavelength side from the carrier wavelength;

a bias voltage applying unit which applies a bias voltage to the optical modulator;

an optical power spectrum measuring unit comprising an optical filter which extracts the carrier spectrum component of wavelength λo from the output light of the optical modulator, and a photoelectric converter which converts the carrier spectrum component to an electrical signal; and a control circuit which controls the bias voltage via the bias voltage applying unit based on measurements of the power spectrum of the output light of the optical modulator, so as to cancel the carrier spectrum component of the carrier wavelength.

5. An optical transmission circuit comprising:

an optical modulator which modulates continuous light at wavelength λo as a carrier wavelength with a signal as a modulating signal at repetition frequency of fo Hz, and outputs alternating phase-inverted pulse light having power spectrum components of both side bands deviated by fo Hz to longer wavelength side and to fo Hz shorter wavelength side from the carrier wavelength;

a bias voltage applying unit which applies a bias voltage to the optical modulator;

an optical power spectrum measuring unit which comprises an optical filter comprising one selected from among a pass-type narrow-band optical filter which passes the carrier spectrum component of wavelength λo, a reflecting-type narrow-band optical filter which reflects the carrier spectrum component of wavelength λo, and a periodic narrow-band optical filter having periodic characteristics in the pass band or reflection band which selectively blocks both side band spectra components of the output light of the optical modulator; and a control circuit which controls the bias voltage via the bias voltage applying unit based on measurements of the power spectrum of the output light of the optical modulator, so as to cancel the carrier spectrum component of the carrier wavelength.

6. The optical transmission circuit according to claim 5, wherein the power spectrum measuring unit comprises an optical filter which extracts from the output light of the optical modulator frequencies at a spectrum component of the carrier wavelength and a spectrum component which has deviated to the longer-wavelength side or shorter-wavelength side by frequency of fo Hz with respect to the carrier wavelength λo, and a photoelectrical converter which converts the spectrum component light to an electrical signal; and the control circuit controls the bias voltage via the bias voltage applying unit so as to cancel the spectrum component of the carrier wavelength for maximizing the power of the electrical signal of the side component.

7. An optical transmission circuit comprising:

an optical modulator which modulates continuous light at wavelength λo as a carrier wavelength with a signal as a modulating signal at repetition frequency of fo Hz, and outputs alternating phase-inverted pulse light having power spectrum components of both side bands deviated by fo Hz to longer wavelength side and to fo Hz shorter wavelength side from the carrier wavelength;

a bias voltage applying unit which applies a bias voltage to the optical modulator;

an optical power spectrum measuring unit which comprises an optical filter comprising one selected from among a pass-type narrow-band optical filter which passes the carrier spectrum component of wavelength λo, a reflecting-type narrow-band optical filter which reflects the carrier spectrum component of wavelength λo, and a periodic narrow-band optical filter having periodic characteristics in the pass band or reflection band which selectively blocks both side band spectra components of the output light of the optical modulator;

wherein the optical filter comprises one selected from among:

a pass-type narrow-band optical filter which passes a spectrum component which has deviated to the longer-wavelength side or shorter-wavelength side by frequency fo Hz with respect to wavelength λo;

a reflecting-type narrow-band optical filter which reflects a spectrum component which has deviated to the longer-wavelength side or shorter-wavelength side by frequency fo Hz with respect to wavelength λo; and a periodic narrow-band optical filter which has periodic characteristics in the pass or reflection band, the pass or reflection wavelength having deviated to the longer-wavelength side or shorter-wavelength side by frequency fo Hz with respect to wavelength λo, and selectively stops the carrier spectrum component of the optical modulator in order to apply the output light of the optical modulator for the optical transmission.

8. An optical transmission circuit comprising:

an optical modulator which modulates continuous light at wavelength λo as a carrier wavelength with a signal as a modulating signal at repetition freguency of fo Hz, and outputs alternating phase-inverted pulse light having power spectrum components of both side bands deviated by fo Hz to longer wavelength side and to fo Hz shorter wavelength side from the carrier wavelength;

a bias voltage applying unit which applies a bias voltage to the optical modulator;

an optical power spectrum measuring unit which comprises an optical filter comprising one selected from among a pass-type narrow-band optical filter which passes the carrier spectrum component of wavelength λo, a reflecting-type narrow-band optical filter which reflects the carrier spectrum component of wavelength λo, and a periodic narrow-band optical filter having periodic characteristics in the pass band or reflection band which selectively blocks both side band spectra components of the output light of the optical modulator;

wherein the optical filter comprises a wavelength-variable filter wherein the pass band and reflecting band can be varied; and the optical filter comprises one selected from among:

a pass-type narrow-band optical filter which passes a spectrum component which has deviated to the longer-wavelength side or shorter-wavelength side by frequency fo Hz with respect to wavelength λo;

a reflecting-type narrow-band optical filter which reflects a spectrum component which has deviated to the longer-wavelength side or shorter-wavelength side by frequency fo Hz with respect to wavelength λo, and wherein the optical filter comprises a wavelength-variable filter and the pass band and reflecting band can be varied; and the control circuit controls the bias voltage via the bias voltage applying unit so as to cancel the optical spectrum of the carrier wavelength for maximizing the power of the electrical signal while varying the pass band or reflection band of the optical filter in order to apply the output light of the optical modulator for the optical transmission.

9. The optical transmission circuit according to claim 8, wherein the optical filter is the reflecting-type narrow-band optical filter, and the reflecting-type narrow-band optical filter comprises a fiber grating, light passing through the fiber grating is the output light of the optical transmission circuit.

10. The optical transmission circuit according to claim 9, wherein the optical filter is the periodic narrow-band optical filter, and the periodic narrow-band optical filter comprises a filter which isolates pass wavelength light having pass wavelength and stop wavelength light having stop wavelength other than the pass wavelength at two output ports, the photoelectric converter is connected to the output port which outputs the pass wavelength light, and the output port which outputs the stop wavelength light is the output port of the optical transmission circuit.

11. The optical transmission circuit according to claim 10, wherein the optical filter comprises a pass-type narrow-band optical filter or a periodic narrow-band optical filter which passes a spectrum component which has deviated to the longer-wavelength side or shorter-wavelength side by frequency fo Hz with respect to wavelength λo; the pass light is branched into two and input to the photoelectric converter, and is the output light of the optical transmission circuit.

12. The optical transmission circuit according to claim 11, wherein the optical filter comprises a dispersive medium, and compensates the dispersion of optical transmission link.

13. The optical transmission circuit according to claim 11, the optical filter comprises dispersive medium material, and compensates the dispersion of optical transmission link.

14. The optical transmission circuit according to claim 5, the optical filter comprises a reflecting-type narrow-band optical filter which reflects the carrier spectrum of the wavelength λo, part of the light output from the laser light source is branched to the reflecting-type narrow-band optical filter; and the control circuit controls the wavelength of the light source so as to maximize the power intensity of the reflected carrier spectrum components of the side band spectrums.

15. The optical transmission circuit according to claim 1, comprising, in addition to the Mach-Zehnder optical modulator, a second Mach-Zehnder modulating unit which modulates continuous light at wavelength λo based on a data signal, the light output from the second modulating unit being input to the first optical modulator so as to remove the carrier spectrum component from the alternating phase-inverted pulse signal for maximizing the power intensity of the side band spectrum.

16. The optical transmission circuit according to claim 15, comprising a first and a second another Mach-Zehnder modulating unit which modulates continuous light at wavelength λo based on a data signal, the light output from the first optical modulator being input to the modulating unit so as to remove the carrier spectrum component.

17. An optical transmission circuit comprising:

an optical modulator which modulates continuous light at wavelength λo with a signal at repetition frequency of fo Hz, and outputs alternating phase-inverted pulse light;

a bias voltage applying unit which applies a bias voltage to the optical modulator;

an optical power spectrum measuring unit having frequency resolution of less than fo Hz which measures the optical power spectrum of light output from the optical modulator; and a control circuit which controls the bias voltage via the bias voltage applying unit based on measurements of the power spectrum of the output light of the optical modulator, so as to minimize the power intensity of the carrier spectrum component of wavelength λo, or to maximize the power intensity of the spectrum component in both side bands;

wherein the optical power spectrum measuring unit comprises an optical filter which extracts the carrier spectrum component of wavelength λo from the output light of the optical modulator, and a photoelectric converter which converts the carrier spectrum component to an electrical signal; and the control circuit controls the bias voltage via the bias voltage applying unit so as to minimize the power of the electrical signal;

wherein the optical filter comprises one selected from among a pass-type narrow-band optical filter which passes the carrier spectrum component of wavelength λo, a reflecting-type narrow-band optical filter which reflects the carrier spectrum component of wavelength λo, and a periodic narrow-band optical filter having periodic characteristics in the pass band or reflection band which selectively blocks both side band spectra components of the output light of the optical modulator, while extracting a carrier spectrum component; and wherein the optical filter is the periodic narrow-band optical filter, and the periodic narrow-band optical filter comprises a filter which isolates pass wavelength light having pass wavelength and stop wavelength light having stop wavelength other than the pass wavelength at two output ports, the photoelectric converter is connected to the output port which outputs the pass wavelength light, and the output port which outputs the stop wavelength light is the output port of the optical transmission circuit.

18. An optical transmission circuit comprising:

an optical modulator which modulates continuous light at wavelength λo with a signal at repetition frequency fo Hz, and outputs alternating phase-inverted pulse light;

a bias voltage applying unit which applies a bias voltage to the optical modulator;

an optical power spectrum measuring unit having frequency resolution of less than fo Hz which measures the optical power spectrum of light output from the optical modulator; and a control circuit which controls the bias voltage via the bias voltage applying unit based on measurements of the power spectrum of the output light of the optical modulator, so as to minimize the power intensity of the carrier spectrum component of wavelength λo, or to maximize the power intensity of the spectrum component in both side bands;

wherein the power spectrum measuring unit comprises an optical filter which extracts from the output light of the optical modulator frequency a spectrum component which has deviated to the longer-wavelength side or shorter-wavelength side by frequency fo Hz with respect to wavelength λo, and a photoelectrical converter which converts the spectrum component light to an electrical signal; and the control circuit controls the bias voltage via the bias voltage applying unit so as to maximize the power of the electrical signal;

wherein the optical filter comprises one selected from among:

a pass-type narrow-band optical filter which passes a spectrum component which has deviated to the longer-wavelength side or shorter-wavelength side by frequency fo Hz with respect to wavelength λo, a reflecting-type narrow-band optical filter which reflects a spectrum component which has deviated to the longer-wavelength side or shorter-wavelength side by frequency fo Hz with respect to wavelength λo, and a periodic narrow-band optical filter which has periodic characteristics in the pass or reflection band, the pass or reflection wavelength having deviated to the longer-wavelength side or shorter-wavelength side by frequency fo Hz with respect to wavelength λo, and selectively stops the carrier spectrum component of the optical modulator while extracting the spectrum component in both side bands; and wherein the optical filter is the periodic narrow-band optical filter, and the periodic narrow-band optical filter comprises a filter which isolates pass wavelength light having pass wavelength and stop wavelength light having stop wavelength other than the pass wavelength at two output ports, the photoelectric converter is connected to the output port which outputs the pass wavelength light, and the output port which outputs the stop wavelength light is the output port of the optical transmission circuit.

19. An optical transmission circuit comprising:

an optical modulator which modulates continuous light at wavelength λo with a signal at repetition frequency fo Hz, and outputs alternating phase-inverted pulse light;

a bias voltage applying unit which applies a bias voltage to the optical modulator;

an optical power spectrum measuring unit having frequency resolution of less than fo Hz which measures the optical power spectrum of light output from the optical modulator; and a control circuit which controls the bias voltage via the bias voltage applying unit based on measurements of the power spectrum of the output light of the optical modulator, so as to minimize the power intensity of the carrier spectrum component of wavelength λo, or to maximize the power intensity of the spectrum component in both side bands;

wherein the power spectrum measuring unit comprises an optical filter which extracts from the output light of the optical modulator frequency a spectrum component which has deviated to the longer-wavelength side or shorter-wavelength side by frequency fo Hz with respect to wavelength λo, and a photoelectrical converter which converts the spectrum component light to an electrical signal; and the control circuit controls the bias voltage via the bias voltage applying unit so as to maximize the power of the electrical signal; and wherein the optical filter comprises a pass-type narrow-band optical filter or a periodic narrow-band optical filter which passes a spectrum component which has deviated to the longer-wavelength side or shorter-wavelength side by frequency fo Hz with respect to wavelength λo; the pass light is branched into two and input to the photoelectric converter, and is the output light of the optical transmission circuit.

20. The optical transmission circuit according to claim 19, the optical filter comprises dispersive medium material, and compensates the dispersion of optical transmission link.

21. An optical transmission circuit comprising:

an optical modulator which modulates continuous light at wavelength λo with a signal at repetition frequency fo Hz, and outputs alternating phase-inverted pulse light;

a bias voltage applying unit which applies a bias voltage to the optical modulator;

an optical power spectrum measuring unit having frequency resolution of less than fo Hz which measures the optical power spectrum of light output from the optical modulator; and a control circuit which controls the bias voltage via the bias voltage applying unit based on measurements of the power spectrum of the output light of the optical modulator, so as to minimize the power intensity of the carrier spectrum component of wavelength λo, or to maximize the power intensity of the spectrum component in both side bands;

wherein the optical power spectrum measuring unit comprises an optical filter which extracts the carrier spectrum component of wavelength λo from the output light of the optical modulator, and a photoelectric converter which converts the carrier spectrum component to an electrical signal; and the control circuit controls the bias voltage via the bias voltage applying unit so as to minimize the power of the electrical signal;

wherein the optical filter comprises one selected from among a pass-type narrow-band optical filter which passes the carrier spectrum component of wavelength λo, a reflecting-type narrow-band optical filter which reflects the carrier spectrum component of wavelength λo, and a periodic narrow-band optical filter having periodic characteristics in the pass band or reflection band which selectively blocks both side band spectra components of the output light of the optical modulator, while extracting a carrier spectrum component;

wherein the optical filter comprises a reflecting-type narrow-band optical filter which reflects the carrier spectrum of the wavelength λo, part of the light output from the laser light source is branched to the reflecting-type narrow-band optical filter; and the control circuit controls the wavelength of the light source so as to maximize the power intensity of the reflected carrier spectrum component.

* * * * *